(12) United States Patent
Miyashita

(10) Patent No.: US 6,226,536 B1
(45) Date of Patent: May 1, 2001

(54) CHARGER CAPABLE OF CONTROLLING ALERTING MEANS AND RADIO EQUIPMENT CONSISTING OF THE CHARGER AND A PORTABLE RADIO APPARATUS

(75) Inventor: Tsutomu Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/066,606

(22) Filed: Apr. 27, 1998

(30) Foreign Application Priority Data

May 8, 1997 (JP) .................................................... 9-118465

(51) Int. Cl.[7] .............................. H04Q 7/20; H04B 1/38; H04B 1/00
(52) U.S. Cl. ......................... 455/567; 567/573; 567/550; 567/574; 567/425
(58) Field of Search ................................. 455/127, 550, 455/567, 573, 574, 575, 572, 425

(56) References Cited

U.S. PATENT DOCUMENTS 5,073,928 * 12/1991 Shimanuki ............................ 379/70
5,469,133 * 11/1995 Hensler et al. .................... 340/407.1

FOREIGN PATENT DOCUMENTS

| 2-277349 | 11/1990 | (JP) . | |
|---|---|---|---|
| 5-83183 | 4/1993 | (JP) . | |
| 5-83333 | 4/1993 | (JP) . | |
| 5-83336 | 4/1993 | (JP) . | |
| 7038625 | * 2/1995 | (JP) | ............................. H04M/1/00 |
| 7-38625 | 2/1995 | (JP) . | |
| 8-126061 | 5/1996 | (JP) . | |

* cited by examiner

Primary Examiner—Daniel S. Hunter
Assistant Examiner—Meless Zewdu
(74) Attorney, Agent, or Firm—Young & Thompson

(57) ABSTRACT

Radio equipment is made up of a portable telephone and a charger for charging it. Whether or not the telephone is set on the charger is determined, when a call incoming occurs while the telephone is set on the charger, the telephone alerts the user of the telephone to the call incoming via a call incoming reporter selected beforehand. If the call incoming reporter selected beforehand uses vibration, a vibration detector included in the charger detects the vibration of the telephone. Subsequently, an alert tone is output via aa speaker included in the charger. When the user hearing the alert tone picks up the telephone from the charger, the alert tone output from the speaker ends.

10 Claims, 16 Drawing Sheets

Fig.4
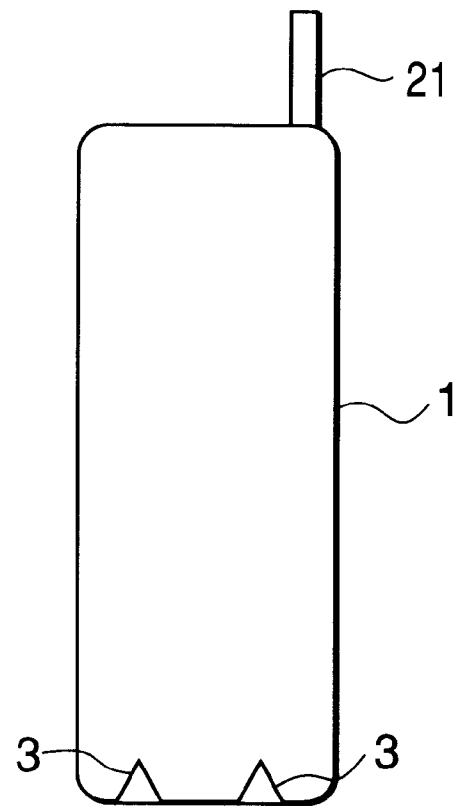
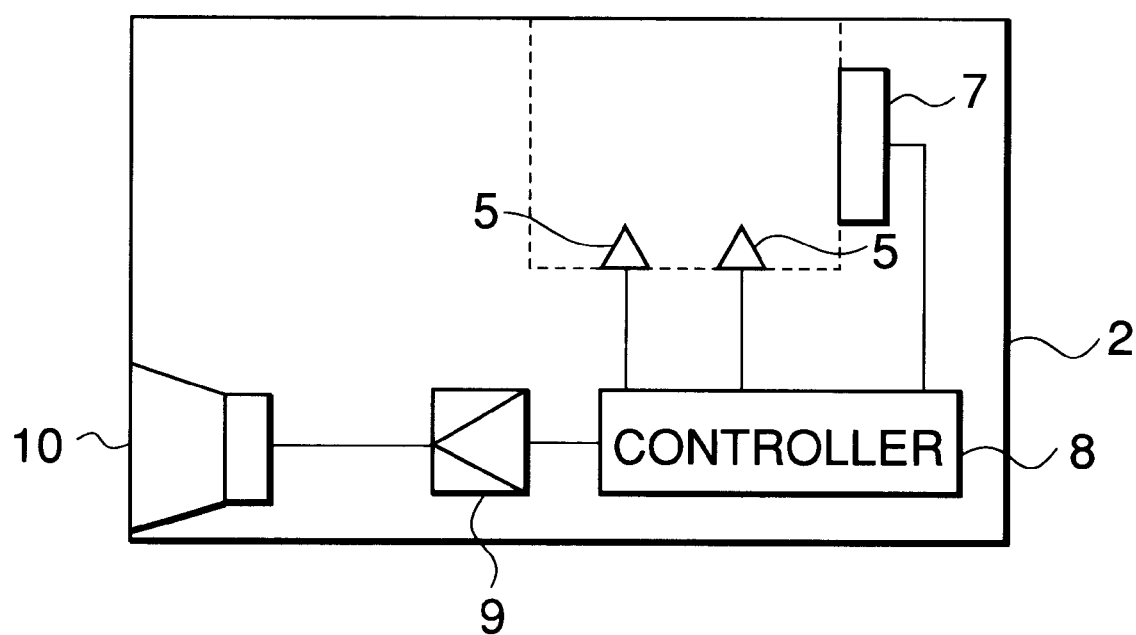

Fig.8

| | COMPARATOR 35 OUTPUT | COMPARATOR 38 OUTPUT | NOT GATE 39 OUTPUT | AND GATE 40 OUTPUT | RESULT OF VIBRATION DETECTION |
|---|---|---|---|---|---|
| $V_o < V_{Lo} < V_{Hi}$ | 1 | 1 | 0 | 0 | 0 |
| $V_{Lo} < V_o < V_{Hi}$ | 1 | 0 | 1 | 1 | 1 |
| $V_{Lo} < V_{Hi} < V_o$ | 0 | 0 | 1 | 0 | 0 |

Fig.14
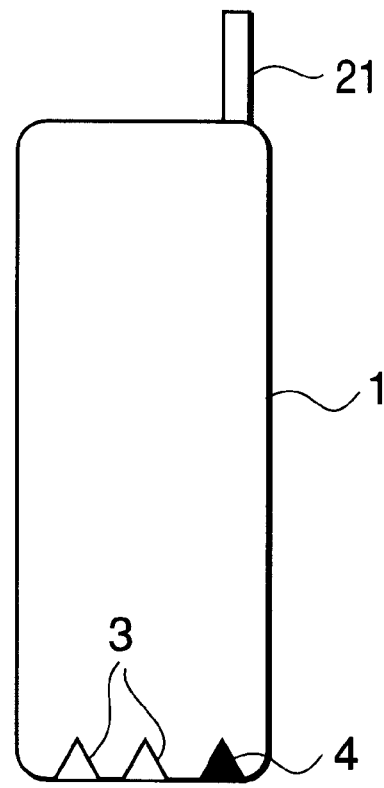
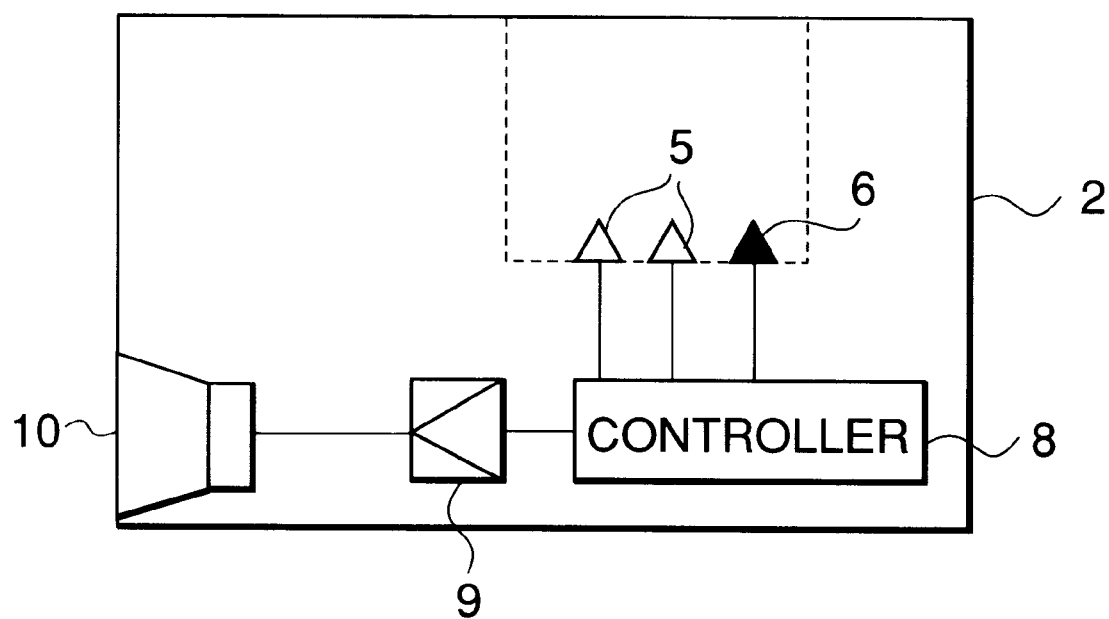

CHARGER CAPABLE OF CONTROLLING ALERTING MEANS AND RADIO EQUIPMENT CONSISTING OF THE CHARGER AND A PORTABLE RADIO APPARATUS

BACKGROUND OF THE INVENTION

1. Field of the Invention

The present invention relates to radio equipment and, more particularly, to radio equipment consisting of a portable radio apparatus and a charger for charging it.

2. Description of the Related Art

It is a common practice with a portable telephone or similar portable radio apparatus to alert the user of the telephone to a call incoming by an alert tone or the vibration of a vibrator, as desired. The user of the telephone may advantageously select an alert mode using the vibration in a situation in which an alert mode using the alert tone is not desirable, e.g., during meeting, on a train, or in a movie theater.

The user of the telephone can select and set either the alert mode using the alert tone (tone mode hereinafter) or the alert mode using the vibration (vibration mode hereinafter) beforehand. Because call incomings are alerted by the set alert mode unless the user changes it, the user can recognize call incomings in the optimal mode matching with the situation. However, the conventional telephone of this kind has its battery charged by a charger in the vibration mode. It follows that when a call incoming occurs on the telephone while the telephone is set on the charger, the user cannot recognize it because the telephone simply vibrates, i.e., does not produce the alert tone.

To solve the above problem, before setting the telephone on the charger, the user may check the alert mode set in the telephone and, if the vibration mode is set, replace it with the tone mode. This, however, brings about another problem that the user must see the alert mode and then set the tone mode every time the user sets the telephone on the charger, resulting in troublesome operation.

In light of the above, the telephone may be so constructed as to report a call incoming in the tone mode whenever the telephone is set on the charger, as taught in Japanese laid-open patent application heisei 8-126061 by way of example. Specifically, this document discloses portable radio communication equipment including a portable telephone provided with detecting means for determining whether or not the telephone is set on a charger. When a call incoming occurs while the telephone is set on the charger, as determined by the detecting means, the telephone outputs an alert tone in order to alert the user of the telephone to the call. When the telephone is not set on the charger, as also determined by the detecting means, the telephone reports the call to the user by vibration without exception, assuming that the telephone is put on the user's body. Therefore, when the telephone is set on the charger, the user can be alerted to the call immediately by the alert tone.

However, the above portable radio communication equipment has some problems left unsolved, as follows. When the telephone is not set on the charger, it reports a call incoming to the user by vibration at all times. As a result, when the telephone is put on a desk or put in a bag by way of example, a call incoming is reported by vibration despite that it should be reported by the alert tone. This prevents the user from recognizing the call. Moreover, the detecting means built in the telephone obstructs the small size, light weight configuration of the telephone.

SUMMARY OF THE INVENTION

It is therefore an object of the present invention to provide radio equipment capable of reporting a call incoming by an alert tone when a portable telephone thereof is set on a charger or reporting, when the telephone is removed from the charger, the call in an alert mode selected before the setting of the telephone on the charger, thereby freeing the user of the telephone from troublesome operation.

It is another object of the present invention to provide radio equipment in which a charger reports a call incoming to the user when a telephone is set on the charger.

It is still another object of the present invention to provide radio equipment in which detecting means for determining whether or not a portable telephone is set on a charger is built in the charger in order to provide the telephone with a small size, light weight configuration.

In accordance with the present invention, a radio equipment includes a portable radio apparatus and a charger for charging it. The charger includes a decision section for determining whether or not the radio apparatus is being charged by the charger, a detecting section for detecting a call incoming on the radio apparatus, and an outputting section for outputting, at the time of a call incoming, an alert tone in response to the output of the decision section and that of the detecting section.

Also, in accordance with the present invention, a charger includes a decision section for determining whether or not a radio apparatus is being charged by the charger, a detecting section for detecting a call incoming on the radio apparatus, and an outputting section for outputting, at the time of a call incoming, an alert tone in response to the output of the decision section and that of the detecting section.

Further, in accordance with the present invention, a method of controlling a report of a call incoming on radio equipment, has the steps of determining whether or not a radio apparatus is being charged, detecting a call incoming on the radio apparatus, and outputting an alert tone from a charger charging the radio apparatus.

Moreover, in accordance with the present invention, a method of controlling a report of a call incoming on radio equipment has the steps of determining whether or not a radio apparatus is set on a charger, recognizing a call incoming on the radio apparatus, determining whether or not the radio apparatus is being charged, outputting an alert tone from the charger, stopping the alert tone when the radio apparatus is removed from the charger, recognizing a call incoming on the radio apparatus, and reporting the call incoming by call incoming reporting means selected before the setting of the radio apparatus on the charger.

BRIEF DESCRIPTION OF THE DRAWINGS

These and other objects, features and advantages of the present invention will become more fully apparent from the following detailed description taken in conjunction with the accompanying drawings in which:

FIG. 4 is a block diagram schematically showing specific circuitry representative of the illustrative embodiment;

FIG. 8 shows a truth table showing specific results output from the vibration detector of FIG. 7;

FIG. 14 is a block diagram schematically showing an alternative embodiment of the present invention;

DETAILED DESCRIPTION OF THE PREFERRED EMBODIMENTS

Figure 1:
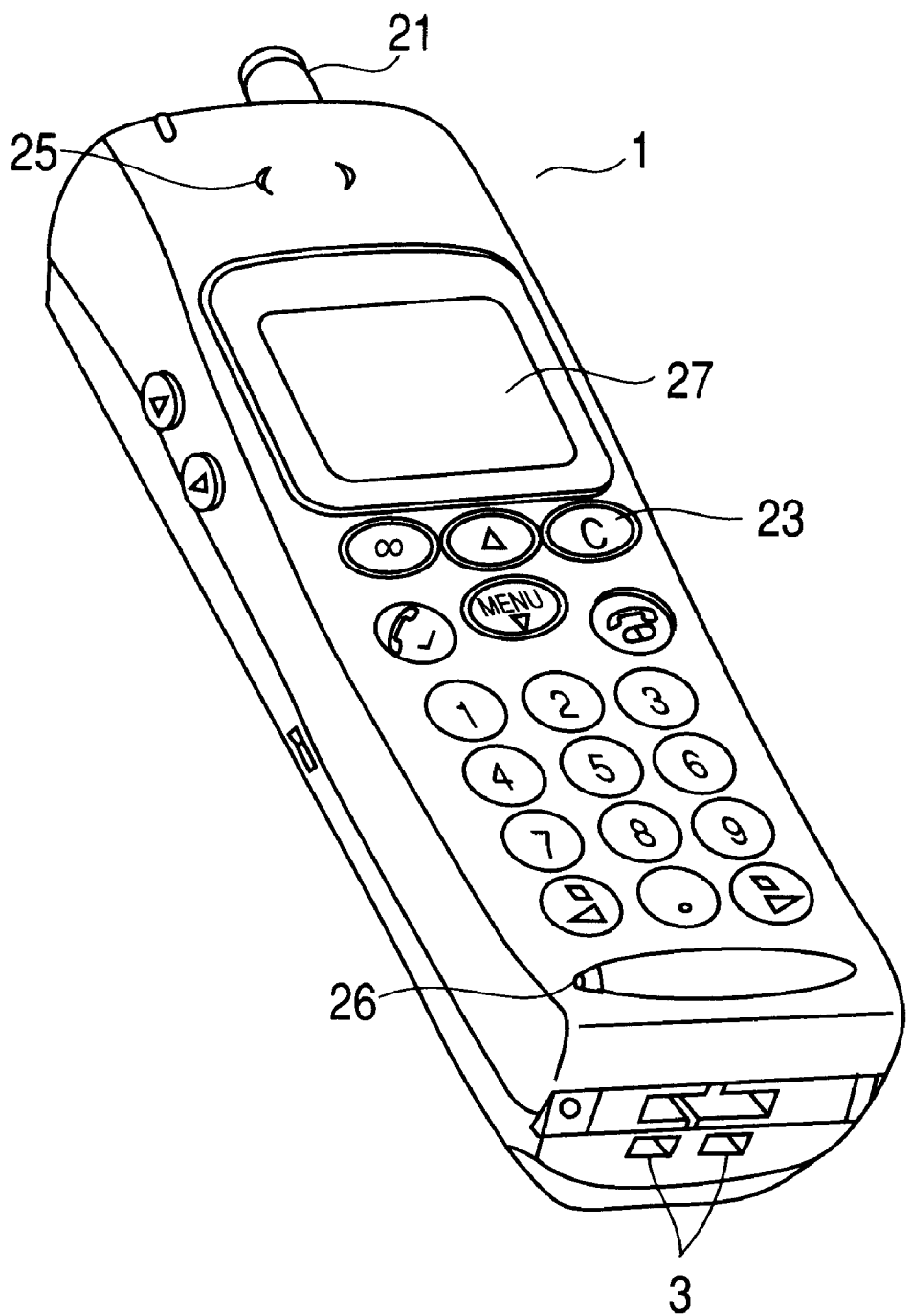
FIG. 1 is an external view showing a specific configuration of a portable telephone included in radio equipment embodying the present invention.

Referring to FIG. 1 of the drawings, a portable telephone included in radio equipment embodying the present invention is shown. As shown, the telephone, generally 1, includes charge terminals 3 provided on the bottom thereof. A rechargeable battery, not shown, is received in the telephone 1 and charged via the charge terminals 3. A function of alerting the user of the telephone 1 to a call incoming by an alert tone or vibration is built in the telephone 1. A speaker for outputting the alert tone is positioned on the rear upper portion of the telephone 1. A receiver portion 25, a transmitter portion 26, an LCD (Liquid Crystal Display) 27 and a key pad 28 are arranged on the front of the telephone 1. The LCD 27 displays various kinds of information including a telephone number input on the key pad 28 and various statuses of the telephone 1. The key pad 28 includes numeral keys and various function keys, as illustrated.

Figure 2:
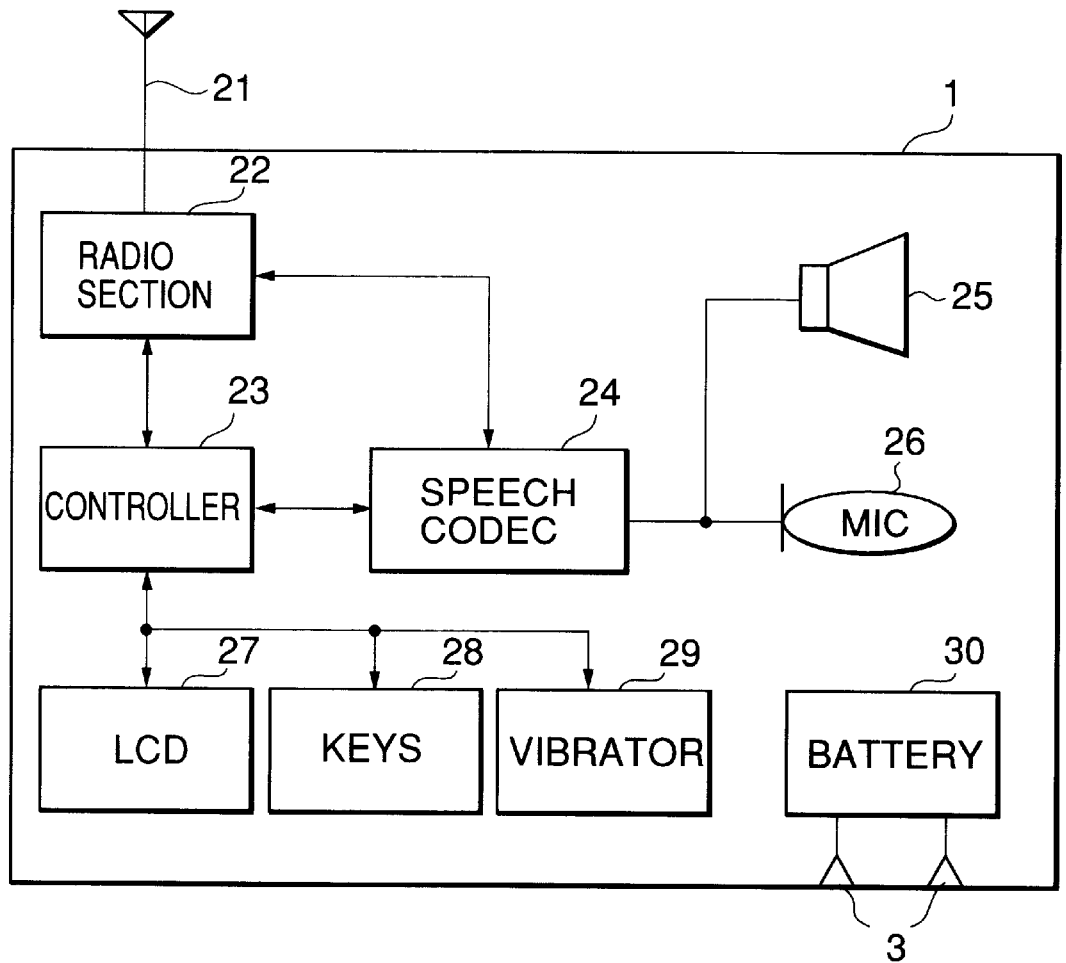
FIG. 2 is a block diagram schematically showing a specific circuit arrangement of the telephone shown in FIG. 1.

FIG. 2 shows a specific circuit arrangement of the telephone 1 which is identical with a conventional circuit arrangement. As shown, an antenna 21 is connected to a radio section 22. The radio section 22 amplifies a high frequency electromagnetic wave coming in through the antenna 21 and demodulates it to output speech data. A speech Codec 24 decodes the speech data output from the radio section 22. A speaker 25 representative of the receiver portion 25, FIG. 1, produces an alert tone in the event of a call incoming. A speech uttered by the user is input to a microphone 26 representative of the transmitter portion 26, FIG. 1. The LCD 27 displays, e.g., a telephone number input on the key pad 28 and an electric field strength. The key pad 28 allows the user to, e.g., input a desired telephone number and select a desired alert mode, i.e., a tone mode or a vibration mode. A vibrator 29 produces a vibration in the event of a call incoming. A controller 23 controls the radio section 22, speech Codec 24, LCD 27, key pad 28, and vibrator 29. A rechargeable battery 30 is mounted on the telephone 1 and charged via the charge terminals 3.

The operation of the telephone 1 is as follows. Assume that a high frequency electromagnetic wave sent from a base station, not shown, is input to the radio section 22 via the antenna 21 while the telephone 1 is in its stand-by state. Then, the controller 23 detects the receipt of the wave and displays it on the LCD 27. At the same time, the controller 23 produces an alert tone via the speaker 25 or causes a vibrator 29 to vibrate, as selected by the user beforehand, and thereby alerts the user to the call.

Figure 3:
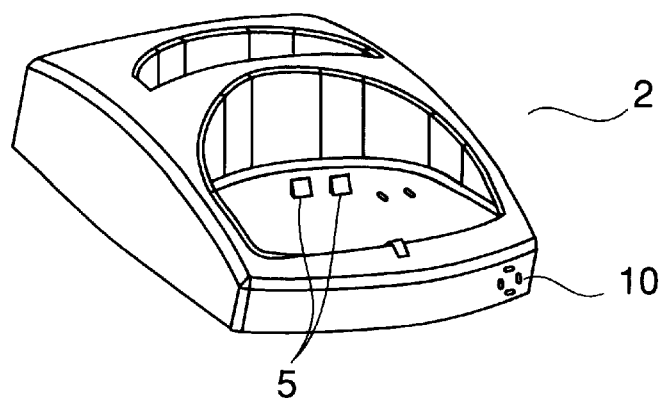
FIG. 3 is an external view showing a specific configuration of a charger also included in the embodiment.

FIG. 3 shows a charger 2 included in the illustrative embodiment. As shown, the charger 2 includes charge terminals 5 positioned such that they mate with the charge terminals 5 of the telephone 1 when the telephone 1 is mounted to the charger 2. A speaker 10 is mounted on the charger 2. When a call is received while the telephone 1 is set on the charger 2, the speaker 10 produces an alert tone.

FIG. 4 shows specific circuitry of the radio apparatus consisting of the telephone 1 and charger 2. The following description will concentrate on the relation between the telephone 1 and the charger 2 as to connection, and the functions of the charger 2. As shown, the charger 2 charges the rechargeable battery, not shown, of the telephone 1 via the charge terminals 5. In the charger 2, a vibration detector 7 detects the vibration of the telephone 1. A controller 8 outputs an electric signal in accordance with the output of the charge terminals 5 and that of the vibration detector 7. An alert tone generator 9 generates an acoustic signal in response to the electric signal output from the controller 8. The acoustic signal is output via the speaker 10 in the form of an alert tone.

Figure 5:
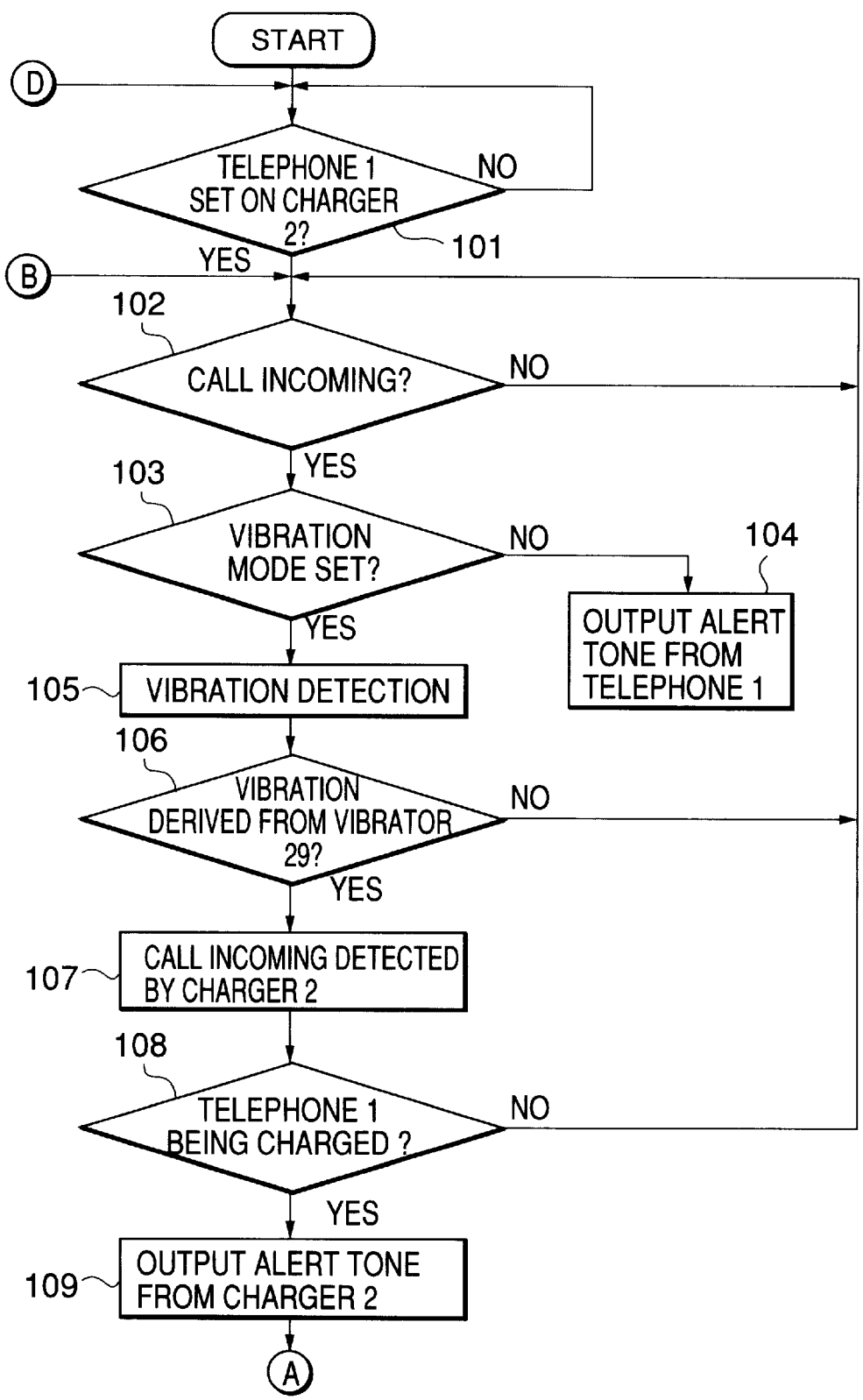
FIGS. 5 and 6 are flowcharts demonstrating a specific operation of the circuitry shown in FIG. 4.
Figure 6:
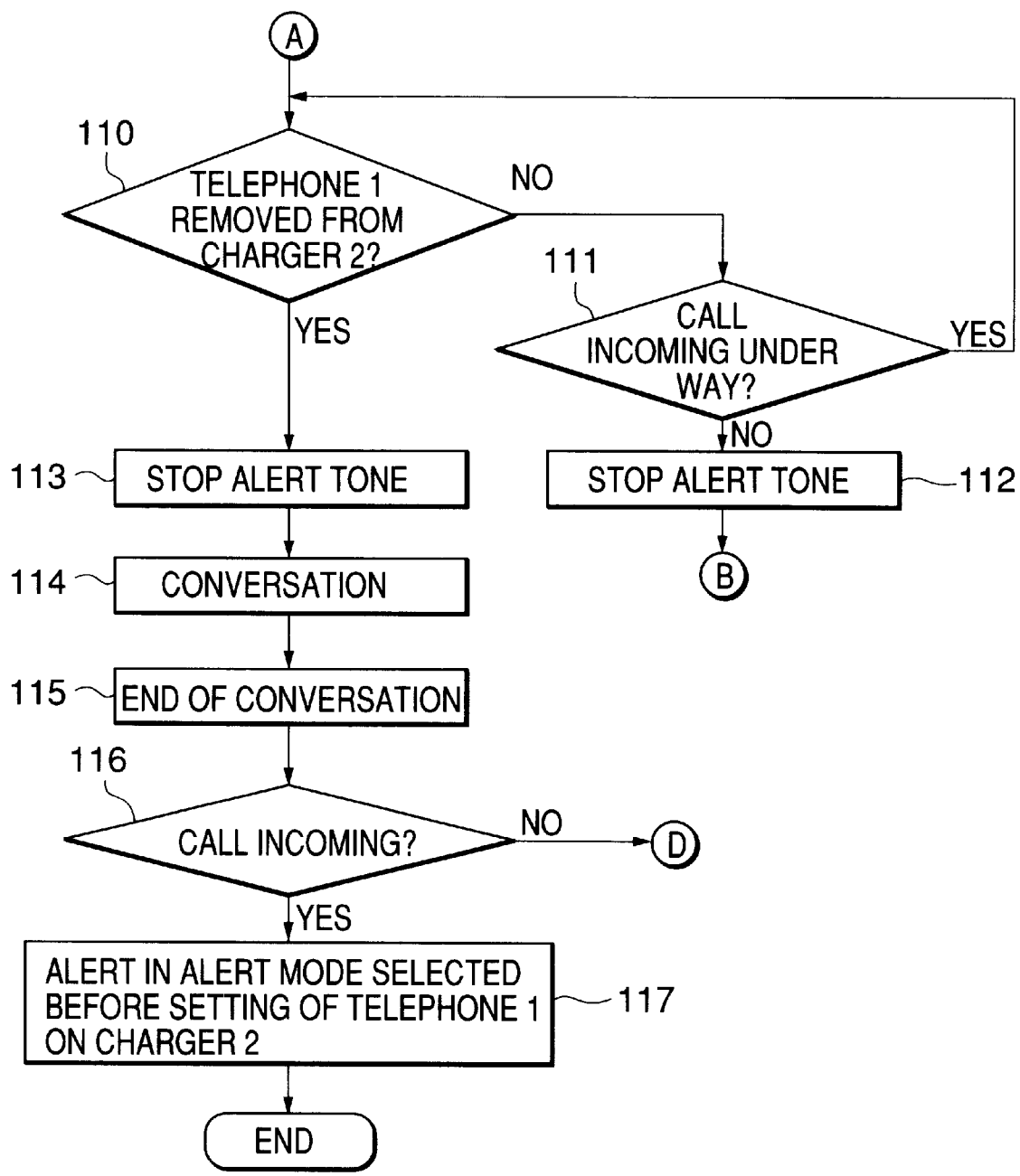

Reference will be made to FIGS. 5 and 6 for describing a specific operation of the radio apparatus shown in FIG. 4. First, when the telephone 1 is set on the charger 2, a charge current flows from the charge terminals 5 to the charge terminals 3. Therefore, the controller 8 of the charger 2 determines that the telephone 1 is set on the charger 2, i.e., the telephone is being charged (YES, step 101). Assume that a call incoming occurs while the telephone 1 being charged is in its stand-by state (YES, step 102). Then, the controller 23 of the telephone 1 produces an alert tone or drives the vibrator 29, as selected by the user beforehand.

When the alert mode using the vibrator 29, i.e., the vibration mode is selected by the user (YES, step 103), the vibration detector 7 detects the vibration of the telephone 1 (step 105). The vibration detector 7 determines whether or not the vibration level lies in a preselected range or whether or not the vibration continues over a preselected period of time, thereby determining whether or not the vibration of the telephone 1 is caused solely by the vibrator 29 (step 106). If the answer of the step 106 is positive (YES), then the controller 8 of the charger 2 determines that a call incoming has occurred (step 107). Then, the controller 8 determines whether or not the telephone 1 is being charged via the charge terminals 5 (step 108). If the answer of the step 108 is YES, the controller 8 of the charger 2 feeds an electric signal to the alert tone generator 9 included in the charger 3. The alert tone generator 9 amplifies the electric signal so as to produce an acoustic signal via the speaker 10, thereby alerting the user to the receipt of a call (step S109).

Assume that the telephone 1 is set on the charger 2 (NO, step 110), but the user is absent, and that the caller stops calling, i.e., closes the channel while the speaker 10 is outputting the alert tone. Then, because the vibration detector 7 detects no vibration, the controller 8 determines that the call incoming has ended (NO, step 111). Subsequently, the controller feeds an electric signal to the alert tone generator 9 to cause it to stop producing the acoustic signal. As a result, the alert tone output via the speaker 10 ends (step S112).

On the other hand, when the user hearing the alert tone output via the speaker 10 picks up the telephone 1 from the charger 2 in order to answer the phone (YES, step 110), the controller 8 determines that the user has started action for conversation. Then, the controller 8 delivers the electric signal for stopping the acoustic signal to the alert tone generator 9. As a result, the alert tone output via the speaker 10 ends (step 113).

The user operates the key pad 28 and holds conversation with the caller (step 114). When another call incoming occurs (YES, step 116) after the end of the conversation (step 115), it is reported to the user in the alert mode or alerting means selected before the setting of the telephone 1 on the charger 2 (step 117).

Assume that the tone mode, as distinguished from the vibration mode, is selected by the user beforehand (NO, step 103). Then, an alert tone is produced via the speaker, not shown, of the telephone 1 in the conventional manner, alerting the user to the call incoming (step 104).

Figure 7:
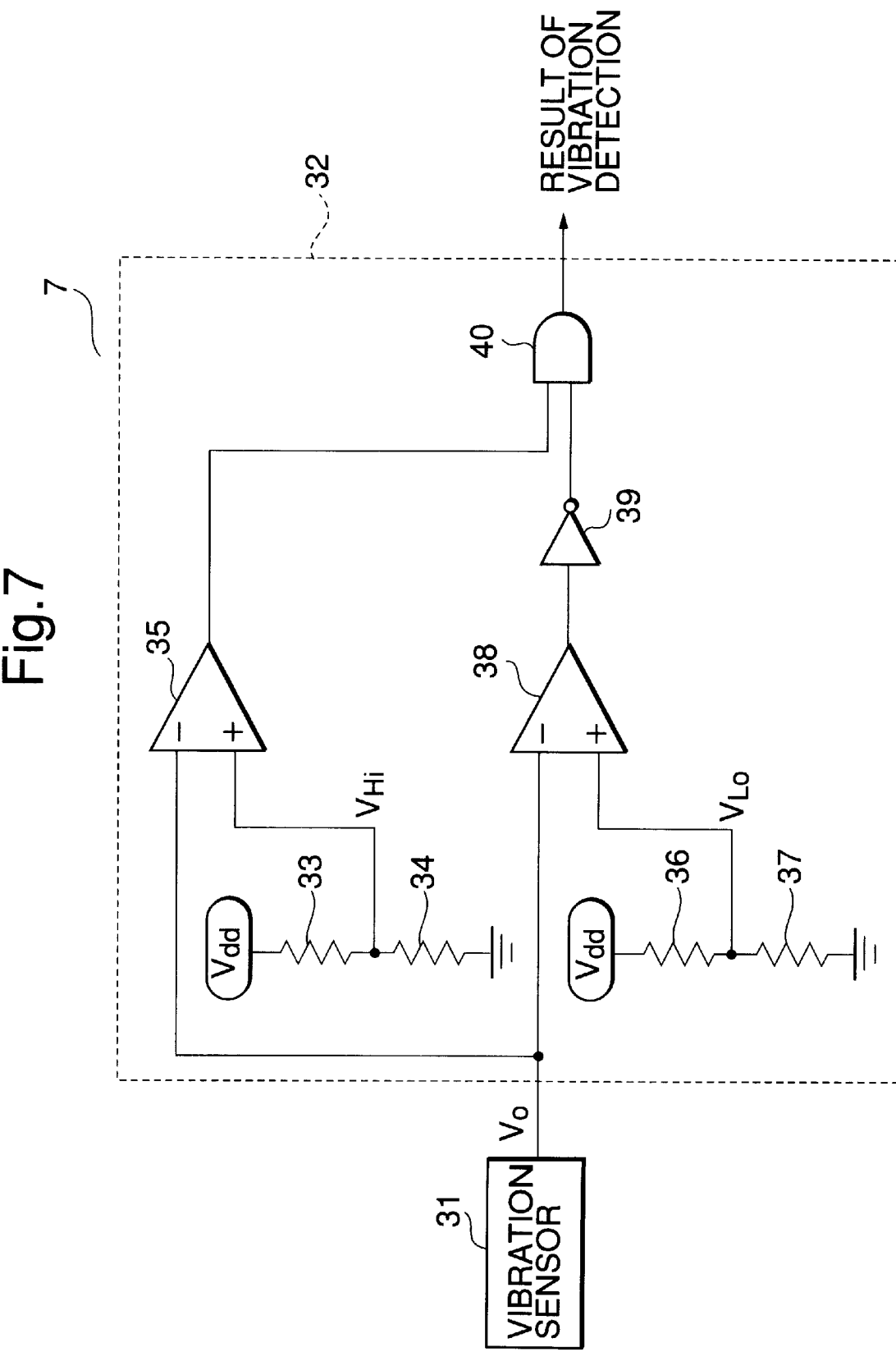
FIG. 7 is a block diagram schematically showing a specific configuration of a vibration detector included in the circuitry of FIG. 4.

FIG. 7 shows a specific configuration of the vibration detector 7 shown in FIG. 4. As shown, the vibration detector 7 includes a vibration sensor 31 capable of outputting a potential $V_o$ proportional to vibration. The vibration sensor 31 may be implemented by a piezoelectric vibration sensor having a piezoelectric material and a weight fitted thereon. For the piezoelectric material, use may be made of Rochelle salt, tourmaline, quartz or similar natural material or barium titanate, zirconate, titanate or similar ferroelectric.

The vibration sensor 31 is connected to a comparison circuit 32. The comparison circuit 32 compares the voltage $V_o$ output from the vibration sensor 31 with reference voltages $V_{Hi}$ and $V_{Lo}$ and outputs the result of comparison. The comparison circuit 32 includes resistors 33 and 34 outputting the reference voltage $V_{Hi}$ by dividing a source voltage Vdd, and resistors 36 and 37 outputting the reference voltage $V_{Lo}$ by dividing the source voltage Vdd. The reference voltage $V_{Hi}$ is selected to be higher than the reference voltage $V_{Lo}$. A comparator 35 compares the output voltage $V_o$ of the vibration sensor 31 with the reference voltage $V_{Hi}$. The comparator 35 outputs a high level or (logical) ONE if the voltage $V_o$ is lower than the voltage $V_{Hi}$, or outputs a low level or (logical) ZERO if the former is higher than the latter. Likewise, a comparator 38 compares the output voltage $V_o$ of the vibration sensor 31 with the reference voltage $V_{Lo}$. The comparator 38 outputs a high level or ONE if the voltage $V_o$ is lower than the voltage $V_{Lo}$, or outputs a low level or ZERO if the former is higher than the latter. A NOT gate 39 inverts the output of the comparator 38 and feeds its output to an AND gate 40. The output of the comparator 35 is also input to the AND gate 40. The AND gate 40 produces an AND of the outputs of the comparator 35 and NOT gate 39.

FIG. 8 shows specific outputs of the vibration detector 7 shown in FIG. 7, i.e., specific results of vibration detection. As shown, when a relation of $V_o<V_{Lo}<V_{Hi}$ holds, the outputs of the comparators 35 and 38 are ONEs. The NOT gate 39 inverts the output of the comparator 38 to produce a ZERO. The AND gate 40 ANDs the output of the comparator 35 and that of the NOT gate 39 to output a ZERO.

When a relation of $V_{Lo}<V_o<V_{Hi}$ holds, the comparators 35 and 38 output a ONE and a ZERO, respectively. The NOT gate 39 inverts the output of the comparator 38 to produce a ONE. The AND gate 40 ANDs the output of the comparator 35 and that of the NOT gate 39 to produce a ONE.

Further, when a relation of $V_{Lo}<V_{Hi}<V_o$ holds, the comparators 35 and 38 both output a ZERO. The NOT gate 39 inverts the output of the comparator 38 to produce a ONE. The AND gate 40 ANDs the output of the comparator 35 and that of the NOT gate 39 to produce a ZERO.

Figure 9:
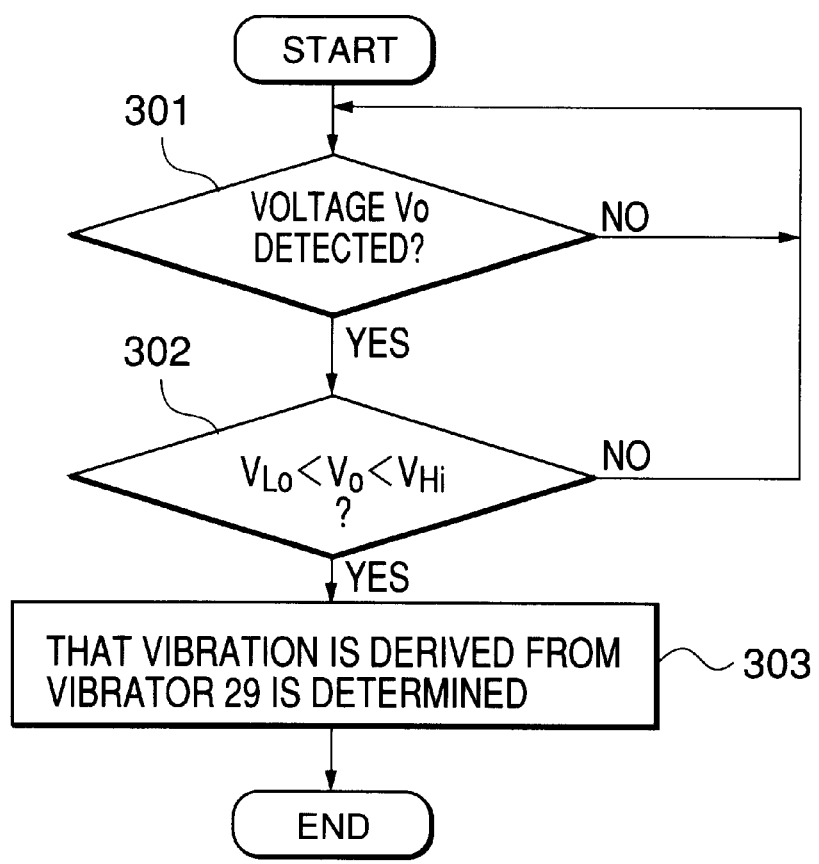
FIG. 9 is a flowchart demonstrating a specific operation of the vibration detector 7 of FIG. 7.

A specific operation of the vibration detector 7 shown in FIG. 7 will be described with reference to FIG. 9. As shown, when the voltage $V_o$ output from the vibration sensor 31 is detected (YES, step 301), the comparison circuit 32 compares the voltage $V_o$ with the reference voltage $V_{Hi}$ and $V_{Lo}$. If the relation of $V_{Lo}<V_o<V_{Hi}$ holds, meaning that the output of the comparison circuit 32 is a ONE (YES, step 302), it is determined that the vibration is derived solely from the vibration 29 (step 303). Therefore, if the upper limit and lower limit of the voltage $V_o$ to be detected on the vibration of the vibrator 29 are respectively selected to be $V_{Hi}$ and $V_{Lo}$, it is possible to detect only the vibration of the vibrator 29.

For example, when the user touches the charger 2 or when something hits against the charger 2, the vibration sensor 31 outputs a voltage $V_o$ of about 2 V. When the charger 2 vibrates due to an earthquake, the vibration sensor 31 outputs a voltage of about 0.5 V. In this case, assuming that the output voltage $V_o$ of the vibration sensor 31 derived from the vibration of the vibrator 29 is between 1.4 V and 1.6 V, then the reference voltages $V_{Hi}$ and $V_{Lo}$ should preferably be 1.6 V and 1.4 V, respectively. When the voltage derived from the vibration of the vibrator 29 has a certain width, a voltage range of above 0.5 V, but below 2 V, may be determined to be representative of the vibration of the vibrator 29.

With the above construction, the vibration detector 7 is capable of surely identifying vibration derived solely from the vibrator 29 on the basis of the level of vibration even when the user touches the charger 2, when something hits against the charger 2, or when the charger 2 vibrates due to an earthquake.

Figure 10:
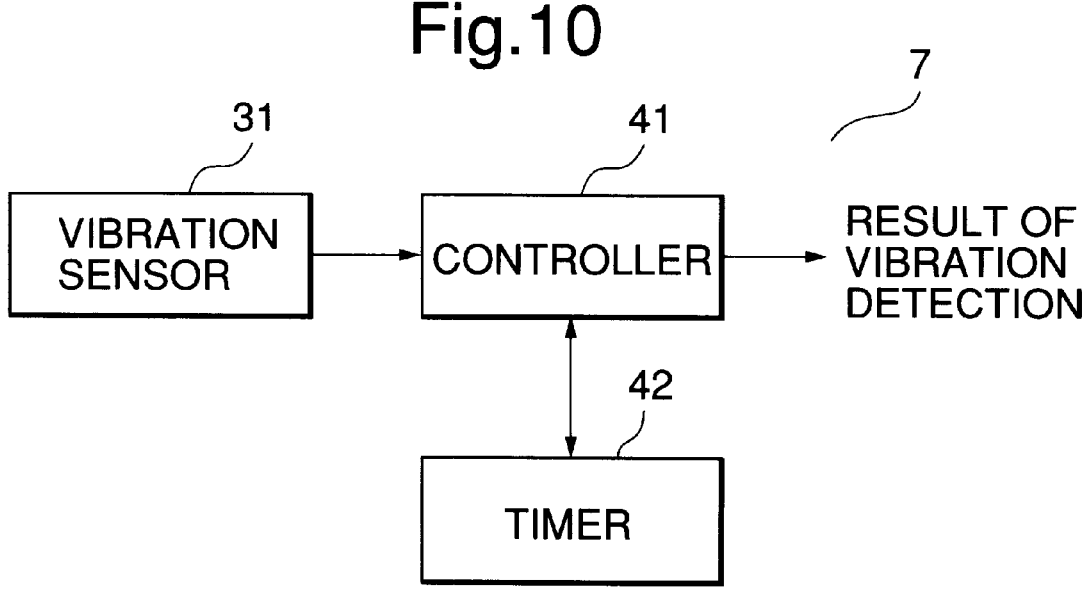
FIG. 10 is a block diagram schematically showing another specific configuration of the vibration detector of FIG. 4.

FIG. 10 shows another specific configuration of the vibration detector 7. While the vibration detector 7 of FIG. 7 determines whether or not the level of vibration lies in a preselected range, the vibration detector 7 of FIG. 10 determines whether or not vibration continues over a preselected period of time. The vibration sensor 31 shown in FIG. 10 is identical with the vibration sensor 31 shown in FIG. 7 and will not be described specifically in order to avoid redundancy. In FIG. 10, a timer 42 starts counting time when the output voltage of the vibration sensor 31 is detected. A controller 41 outputs a result of vibration detection when the timer 42 counts a preselected period of time.

Figure 11:
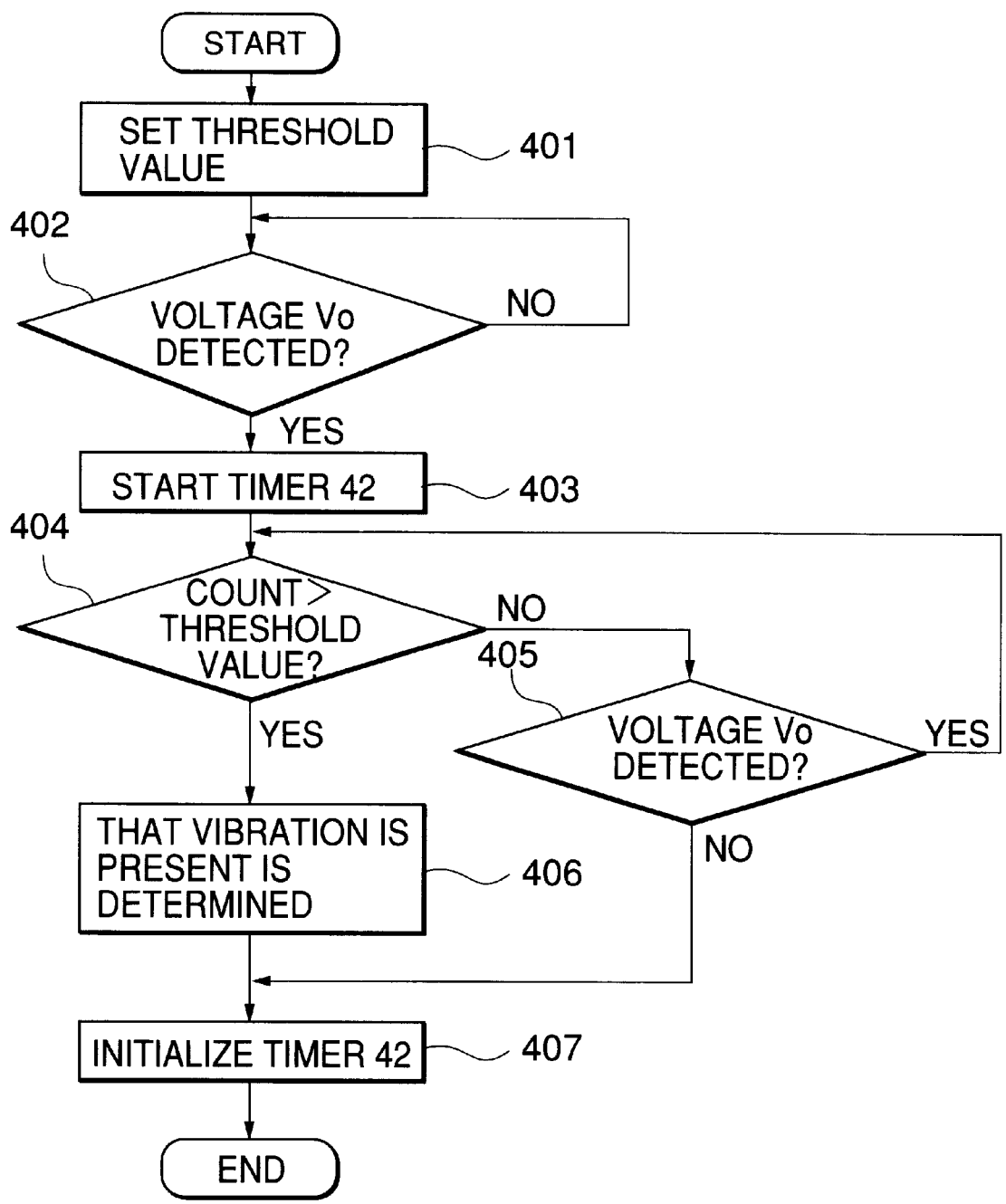
FIG. 11 is a flowchart representative of a specific operation of the vibration detector shown in FIG. 10.

A specific operation of the vibration detector 7 shown in FIG. 10 will be described with reference to FIG. 11. First, a threshold value to be counted by the timer 42 until the controller 41 determines that vibration ascribable to the vibration of the vibrator 29 has occurred, e.g., 5 seconds is set (step 401). The threshold value may be set by the user on switches, not shown, or stored in the controller 41 beforehand. When the output voltage of the vibration sensor 31 is detected (YES, step 402), the controller 41 starts the timer 42 (step 403) and starts comparing the count of the timer 42 and the threshold value. When the count of the timer 42 exceeds the threshold value (YES, step 404), the controller 41 determines that the current vibration is derived solely from the vibration of the vibrator 29 (step 406). Subsequently, the controller 41 initializes the timer 42, i.e., resets it to zero (step 407).

If the count of the timer 42 is smaller than the threshold value (NO, step 404), the controller 41 determines whether or not the output voltage of the vibration sensor 31 is detected (step 405). If the answer of the step 405 is YES, the controller 41 again executes the step 404. If the answer of the step 405 is NO, meaning that the vibration has ended before the threshold period of time expires, the controller 41 determines that the vibration is not derived from the vibrator 29 and initializes the timer 42 (step 407).

The vibration of the vibrator 29 continues from the time of the call incoming to the time of the off-hook of the telephone 1. Therefore, when the vibration is continuously detected over the preselected period of time, the vibration detector 7 determines that the vibration is derived from the vibrator 29.

With the above construction, the vibration detector 7 is also capable of surely identifying only the vibration of the vibrator 29 on the basis of the duration of vibration even when the user touches the charger 2 or when something hits against the charger 2.

If desired, the configurations described with reference to FIGS. 7 and 10 may be combined. In such a case, when vibration whose level lies in the preselected range continues over the preselected period of time, the vibration detector 7 will determine that the vibration is derived solely from the vibrator 29.

Figure 12:
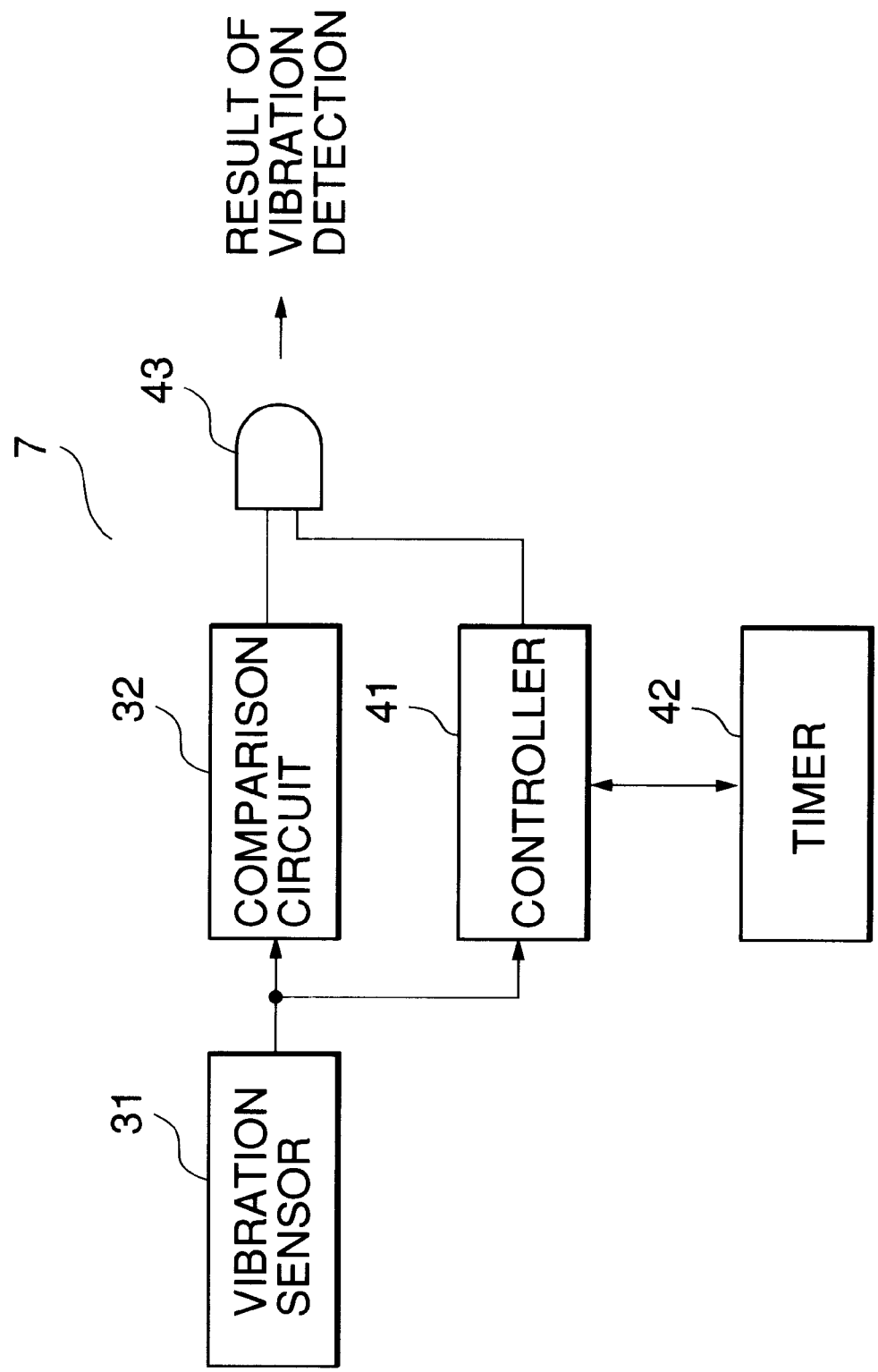
FIG. 12 is a block diagram schematically showing still another specific configuration of the vibration detector of FIG. 4.
Figure 13:
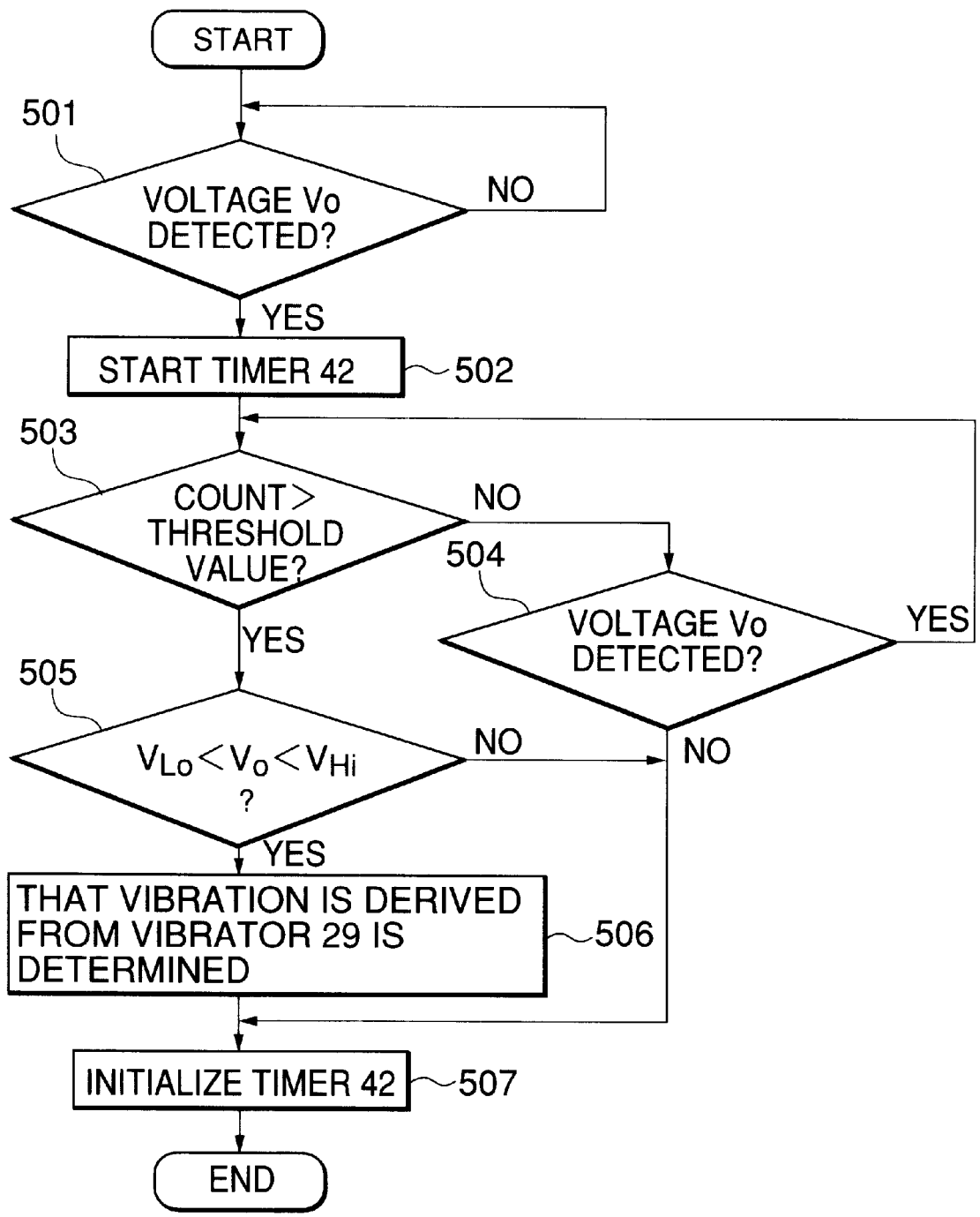
FIG. 13 is a flowchart representative of a specific operation of the vibration detector shown in FIG. 12.

FIG. 12 shows a specific configuration of the vibration detector 7 for implementing the above combined vibration level and duration scheme. As shown, this configuration also includes the vibration sensor 31 of FIG. 7 and the controller 41 and timer 42 of FIG. 10. An AND gate 43 produces an AND of the output of the comparison circuit 32 and that of the controller 41. FIG. 13 demonstrates a specific operation of the vibration detector 7 shown in FIG. 12. In FIG. 13, steps 501-104 and 507 are respectively identical with the steps 402–405 and 407 of FIG. 11 while a step 505 is identical with the step 302 of FIG. 9. Briefly, the vibration detector 7 determines that vibration is derived only from the vibrator 29 when the vibration has a level lying in the preselected range and continues over the preselected period of time.

With the above construction, the vibration detector 7 is also capable of surely identifying only the vibration of the vibrator 29 on the basis of the level and duration of vibration even when the user touches the charger 2, when something hits against the charger 2, or when the charger 2 vibrates due to an earthquake.

Referring to FIG. 14, an alternative embodiment of the present invention will be described. In FIG. 14, structural elements identical with the structural elements shown in FIG. 4 are denoted by identical reference numerals and will not be described specifically in order to avoid redundancy. As shown, this embodiment differs from the previous embodiment in that the vibration detector 7 is absent, in that the telephone 1 additionally includes a call incoming report signal terminal 4 adjoining the charge terminals 3, and in that the charger 2 additionally includes a call incoming report signal terminal 6. The terminal 6 is positioned such that it mates with the terminal 4 when the telephone 1 is set on the charger 2. When the telephone receives a call 1, it delivers a call incoming report signal to the charger 2 via the terminals 4 and 6.

Figure 15:
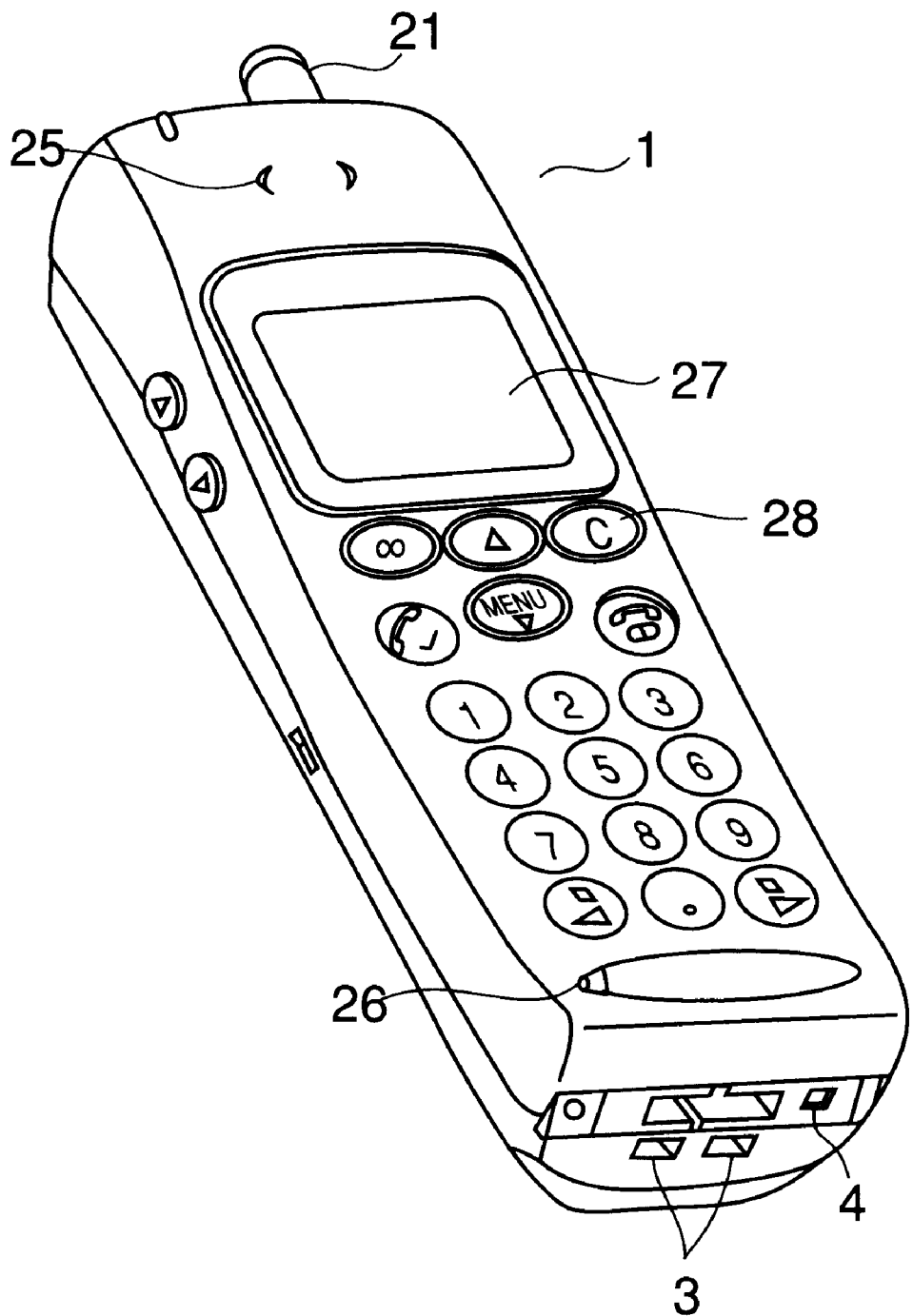
FIG. 15 is an external view showing a portable telephone included in the alternative embodiment shown in FIG. 14.

FIG. 15 shows a specific configuration of the telehone 1 included in this embodiment. In FIG. 15, structural elements identical with the structural elements of the telephone 1 shown in FIG. 1 are denoted by identical reference numerals. As shown, the call incoming report signal terminal 4 is positioned on the bottom of the telephone 1 in the vicinity of the charge terminals 3.

Figure 16:
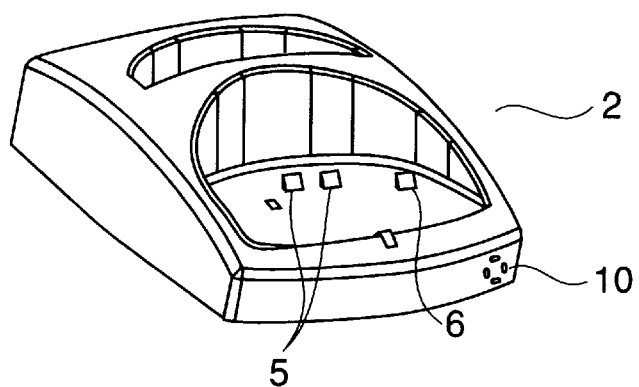
FIG. 16 is an external view of a charger also included in the alternative embodiment.

FIG. 16 shows a specific configuration of the charger 2 also included in this embodiment. In FIG. 16, structural elements identical with the structural elements shown in FIG. 3 are denoted by identical reference numerals. As shown, the call incoming report signal terminal 4 is positioned on the top of the charger 2 in the vicinity of the charge terminals 5.

Figure 17:
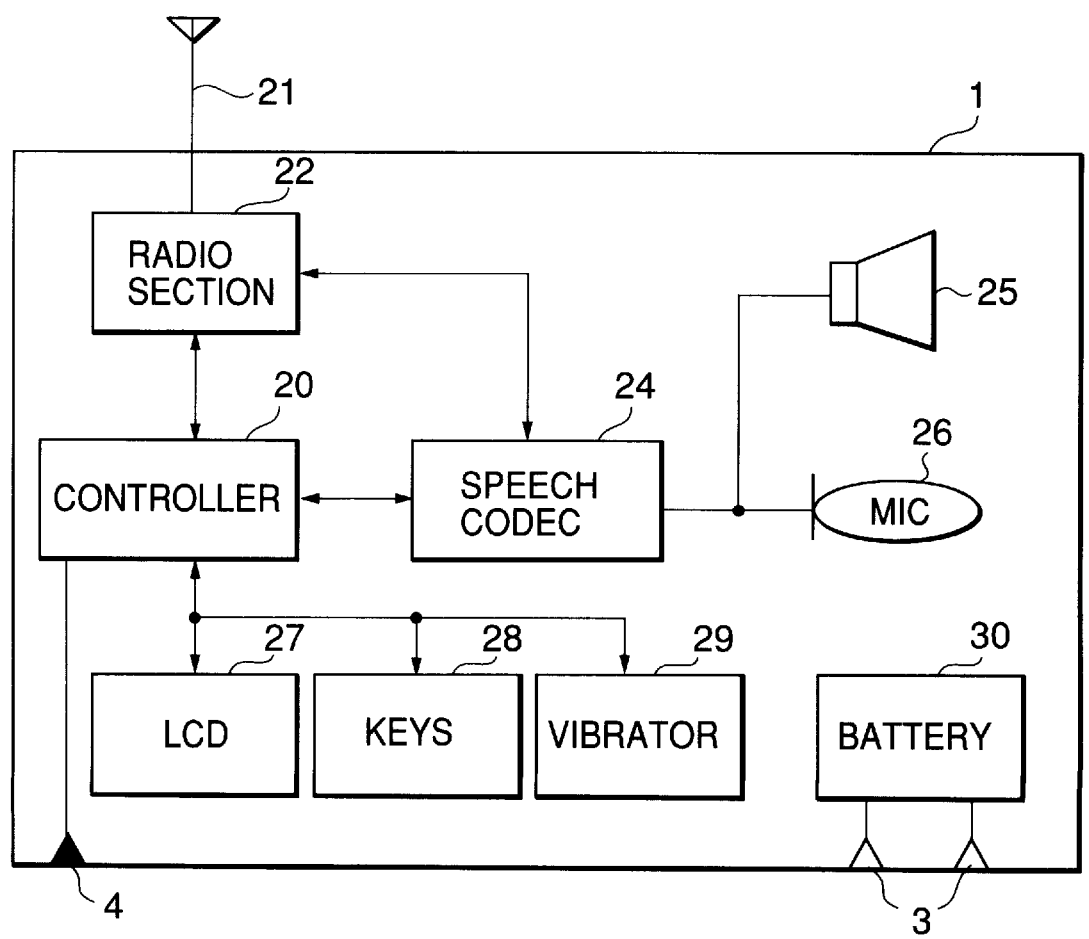
FIG. 17 is a block diagram schematically showing a specific configuration of the telephone of FIG. 15.

FIG. 17 shows a specific circuit arrangement of the telephone 1 of FIG. 14. In FIG. 17, structural elements identical with the structural elements shown in FIG. 2 are denoted by identical reference numerals. As shown, the call incoming report signal terminal 4 is connected to the controller 20. When the radio section 22 receives a high frequency electromagnetic wave from a base station, not shown, via the antenna in the stand-by state of the telehone 1, the controller 20 detects the receipt and feeds a call incoming report signal to the terminal 4. As for the rest of the construction, the telephone 1 is identical with the telephone 1 of the previous embodiment.

Figure 18:
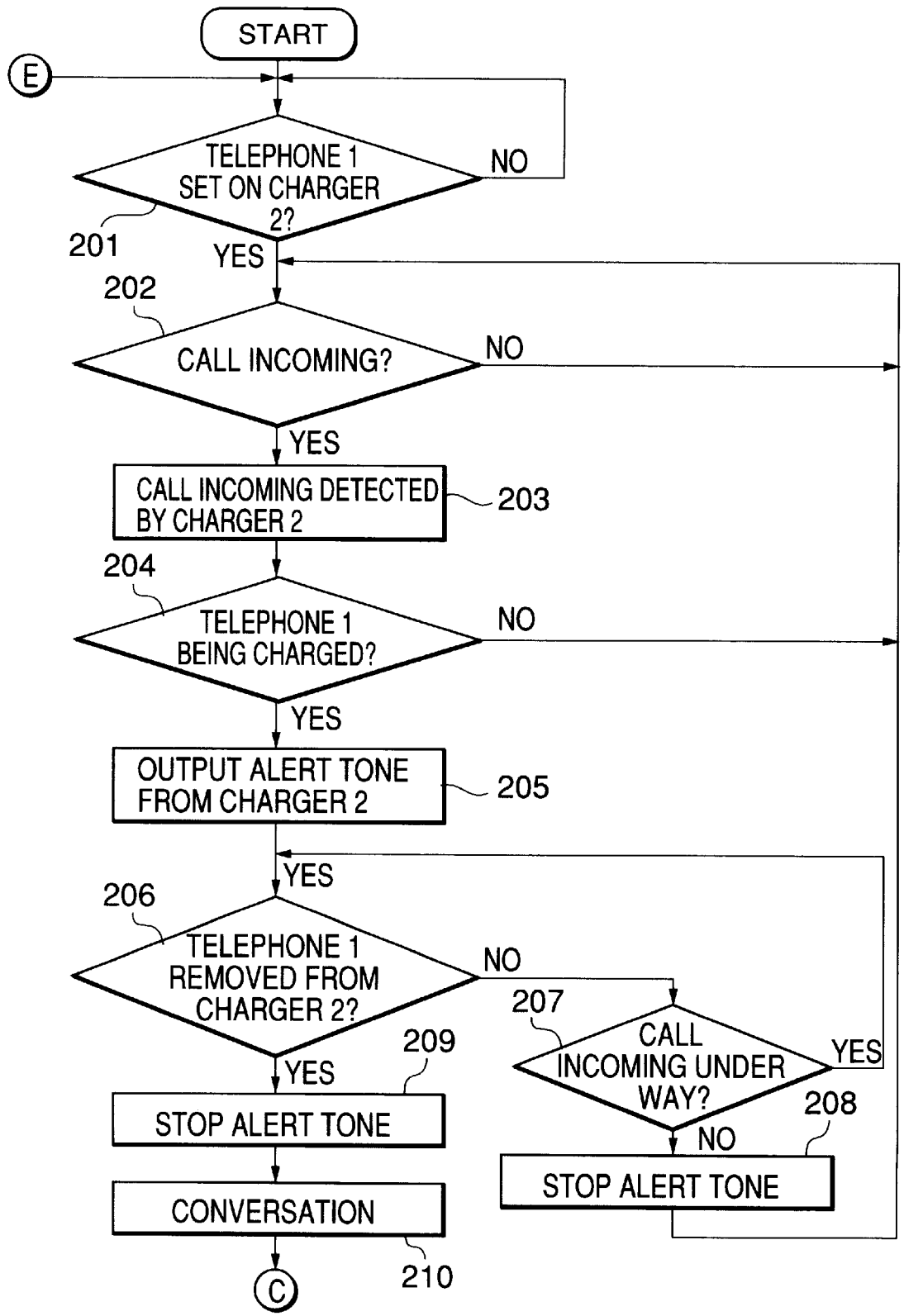
FIGS. 18 and 19 are flowcharts demonstrating a specific operation of the alternative embodiment shown in FIG. 14.
Figure 19:
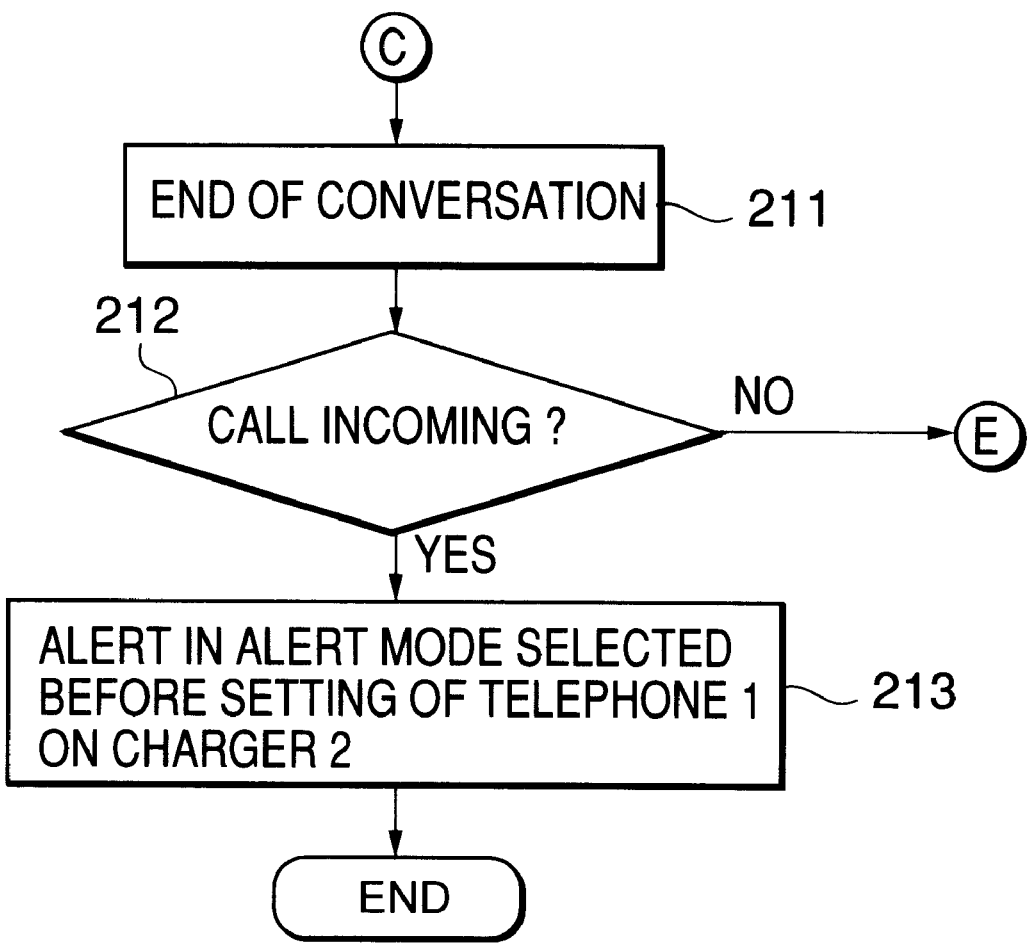

Reference will be made to FIGS. 18 and 19 for describing a specific operation of the above embodiment. As shown, when the telephone 1 is set on the charger 2, a charge current flows from the charge terminals 3 to the charge terminals 5. In response, the controller 8 of the charger 2 determines that the telephone 1 is set on the charger 2, i.e., the telephone 1 is being charged (YES, step 201). When a call incoming occurs when the telephone 1 being charged is in its stand-by state (YES, step 202), an electric signal is fed from the call incoming report signal terminal 4 to the call incoming report signal terminal 6. In response, the controller 8 of the charger 2 recognizes the call incoming on the telephone 1 (step 203). If the telephone 1 is being charged via the charge terminals 5 (YES, step 204), the controller 8 of the charger 2 delivers an electric signal to the alert tone generator 9. The alert tone generator 9 amplifies the input electric signal and thereby outputs an acoustic signal via the speaker 10 (step 205). The acoustic signal alerts the user to the receipt of a call.

Steps 206–213 are respectively identical with the steps 110–117 shown in FIG. 6 and will not be described in order to avoid redundancy.

In the illustrative embodiment, while the telephone 1 is set on the charger 2, the user is alerted to the receipt of a call by the alert tone without regard to the alert method selected by the user beforehand. This makes it needless for the user to select the tone mode every time the user sets the telephone 1 on the charger 2. Further, when the user picks up the telephone 1 from the charger 2, the telephone 1 automatically restores the alert mode selected by the user before charging. The user therefore does not have to confirm or switch the alert mode after removing the telephone 1 from the charger 2.

In the embodiments shown and described, the telephone 1 includes call incoming reporting means using an alert tone and vibration. If desired, the call incoming reporting means may alternatively be implemented by, e.g., an LED (Light Emitting Diode) For example, the first embodiment may include an LED in addition to the vibration detector 7.

Of course, the positions of the charge terminals 3 and 5 shown in FIGS. 1 and 13 are only illustrative. The crux is that the charge terminals 3 and 5 are so positioned as to allow the telephone 1 to be set on the charger 2. It follows that the configurations of the telephone 1 and charger 2 shown in FIGS. 2, 3, 14 and 15 may be changed or modified, as desired.

When a call incoming occurs on the telephone 1 set on the charger 2, and if the alert mode selected beforehand is not the vibration mode, then the alert tone may be output not only via the speaker of the telephone 1 but also via the speaker of the charger 2. The alert tones output from the two speakers will have a volume great enough to surely alert the user to the receipt of a call.

The telephone 1 may be provided with a hands-free feature in order to allow the user to talk with the caller without removing the telephone 1 from the charger 2. This can be done if the radio section 22, controller 23 and so forth of the telephone 1 shown in FIG. 4 are built in the charger 2. Alternatively, an arrangement may be made such that a hands-free function is automatically activated by a call incoming occurred during charging.

Moreover, the charger 2 may be provided with a memory feature in order to record the caller's message when the channel is disconnected due to the absence of the user after the call incoming has been reported over a preselected period of time. This allows the user to see the recorded message later and can be done if a memory is built in the telephone 1 or the charger 2. When the caller's message is recorded, it is preferable to show the presence of the message on the LCD 27 of the telephone 1 and a display, not shown, provided on the charger 2.

Obviously, numerous modifications and variations of the present invention are possible in light of the above teachings. It is therefore to be understood that within the scope of the appended claims, the invention may be practiced otherwise than as specifically described herein.

What is claimed is:

1. Radio equipment comprising:
   a portable radio apparatus;
   a charger for charging said radio apparatus,
   said charger comprising
      a decision means for determining whether or not said radio apparatus is being charged by said charger;
      a detecting means for detecting a call incoming on said radio apparatus; and
      an outputting means for outputting, at the time of a call incoming, an alert tone in response to an output of said decision means and an output of said detecting means, wherein at the time of the call incoming said outputting means outputs the alert tone if said decision means determines that said radio apparatus is being charged and if said detecting means detects the call incoming,
      wherein said detecting means comprises vibration detecting means for detecting vibration of said radio apparatus and
      wherein said vibration detecting means comprises
         a sensing means for outputting a voltage proportional to the vibration of said radio apparatus;
         a comparing means for comparing a level of the voltage with reference voltages; and
         a determining means for determining, if the level of the voltage lies in a preselected range, that the vibration of said radio apparatus is derived solely from the call incoming.

2. Radio equipment as claimed in claim 1, wherein said radio apparatus includes first charge terminals while said charger includes second charge terminals, said decision means determining whether or not said radio apparatus is being charged on the basis of outputs of said first charge terminals and said second charge terminals.

3. Radio equipment as claimed in claim 1, wherein said radio apparatus comprises a portable telephone.

4. Radio equipment as claimed in claim 1, wherein said portable telephone includes a hands-free function and a message memory function.

5. Radio equipment as claimed in claim 1, wherein said radio apparatus includes a first call incoming report signal terminal while said charger includes a second call incoming report signal terminal, said detecting means detecting a call incoming on said portable apparatus in response to outputs of said first and second call incoming report signal terminals.

6. Radio equipment comprising:
   a portable radio apparatus;
   a charger for charging said radio apparatus,
   said charger comprising
      a decision means for determining whether or not said radio apparatus is being charged by said charger;
      a detecting means for detecting a call incoming on said radio apparatus; and
      an outputting means for outputting, at the time of a call incoming, an alert tone in response to an output of said decision means and an output of said detecting means, wherein at the time of the call incoming said outputting means outputs the alert tone if said decision means determines that said radio apparatus is being charged and if said detecting means detects the call incoming, wherein said detecting means comprises vibration detecting means for detecting vibration of said radio apparatus and
      wherein said vibration detecting means comprises
         a sensing means for outputting a voltage proportional to the vibration of said radio apparatus;
         a comparing means for comparing a level of the voltage with reference voltages;
         a counting means for counting a duration of the voltage; and
         a determining means for determining, if the voltage has a level lying in a preselected range and continues over a preselected duration, that the vibration of said radio apparatus is derived solely from the call incoming.

7. Radio equipment as claimed in claim 6, wherein said radio apparatus includes first charge terminals while said charger includes second charge terminals, said decision means determining whether or not said radio apparatus is being charged on the basis of outputs of said first charge terminals and said second charge terminals.

8. Radio equipment as claimed in claim 6, wherein said radio apparatus comprises a portable telephone.

9. Radio equipment as claimed in claim 6, wherein said portable telephone includes a hands-free function and a message memory function.

10. Radio equipment as claimed in claim , wherein said radio apparatus includes a first call incoming report signal terminal while said charger includes a second call incoming report signal terminal, said detecting means detecting a call incoming on said portable apparatus in response to outputs of said first and second call incoming report signal terminals.

* * * * *